(12) United States Patent
Furia et al.

(10) Patent No.: US 10,532,792 B2
(45) Date of Patent: *Jan. 14, 2020

(54) GEAR SHIFT LEVER ASSEMBLY

(71) Applicant: Hammerhead Designs, Inc., Redwood City, CA (US)

(72) Inventors: Weston Rocco Furia, San Jose, CA (US); John Clark, Woodside, CA (US)

(73) Assignee: Hammerhead Designs, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,850

(22) Filed: Aug. 28, 2018

(65) Prior Publication Data

US 2019/0061878 A1 Feb. 28, 2019

Related U.S. Application Data

(63) Continuation of application No. 15/429,510, filed on Feb. 10, 2017, now Pat. No. 10,065,707.

(51) Int. Cl.
| | | |
|---|---|---|
| *B60K 20/00* | (2006.01) | |
| *G05G 9/00* | (2006.01) | |
| *B62M 25/06* | (2006.01) | |
| *F16H 59/04* | (2006.01) | |
| *F16H 59/02* | (2006.01) | |
| *B62K 23/08* | (2006.01) | |

(52) U.S. Cl.
CPC ............ *B62M 25/06* (2013.01); *B62K 23/08* (2013.01); *F16H 59/0278* (2013.01); *F16H 59/04* (2013.01); *F16H 2059/0234* (2013.01)

(58) Field of Classification Search
CPC ............ B62M 25/06; F16H 2059/0234; F16H 59/04; F16H 2059/0278
See application file for complete search history.

(56) References Cited

U.S. PATENT DOCUMENTS

| | | |
|---|---|---|
| 2,540,926 A | 2/1951 | Zook |
| 4,009,623 A | 3/1977 | Smith |

(Continued)

OTHER PUBLICATIONS

"U.S. Appl. No. 15/429,510, Non Final Office Action dated Dec. 6, 2017", 7 pgs.

(Continued)

*Primary Examiner* — Jake Cook
(74) *Attorney, Agent, or Firm* — Schwegman Lundberg & Woessner, P.A.

(57) ABSTRACT

A gear shift lever assembly includes a gear shift lever arm which includes a distal foot-peg end and a bifurcated proximal end and first passageway for facilitating securement of the gear shift lever arm to a gear selector spindle shaft of a motorcycle. The assembly also includes a spindle shaft mount insert sized to fit within the bifurcated ends of the gear shift lever arm. The insert has a splined aperture that matches the splines of the splines of the gear selector spindle shaft, and a second passageway having a longitudinal axis transverse to the longitudinal axis of the splined aperture. The gear shift lever assembly is mountable to the gear selector spindle shaft of the motorcycle with the spindle shaft mount insert interposed between the bifurcated proximal end of the gear shift lever arm with a mounting bolt passed through the aligned first and second passageways.

12 Claims, 7 Drawing Sheets

(56) References Cited

U.S. PATENT DOCUMENTS

Figure 1:
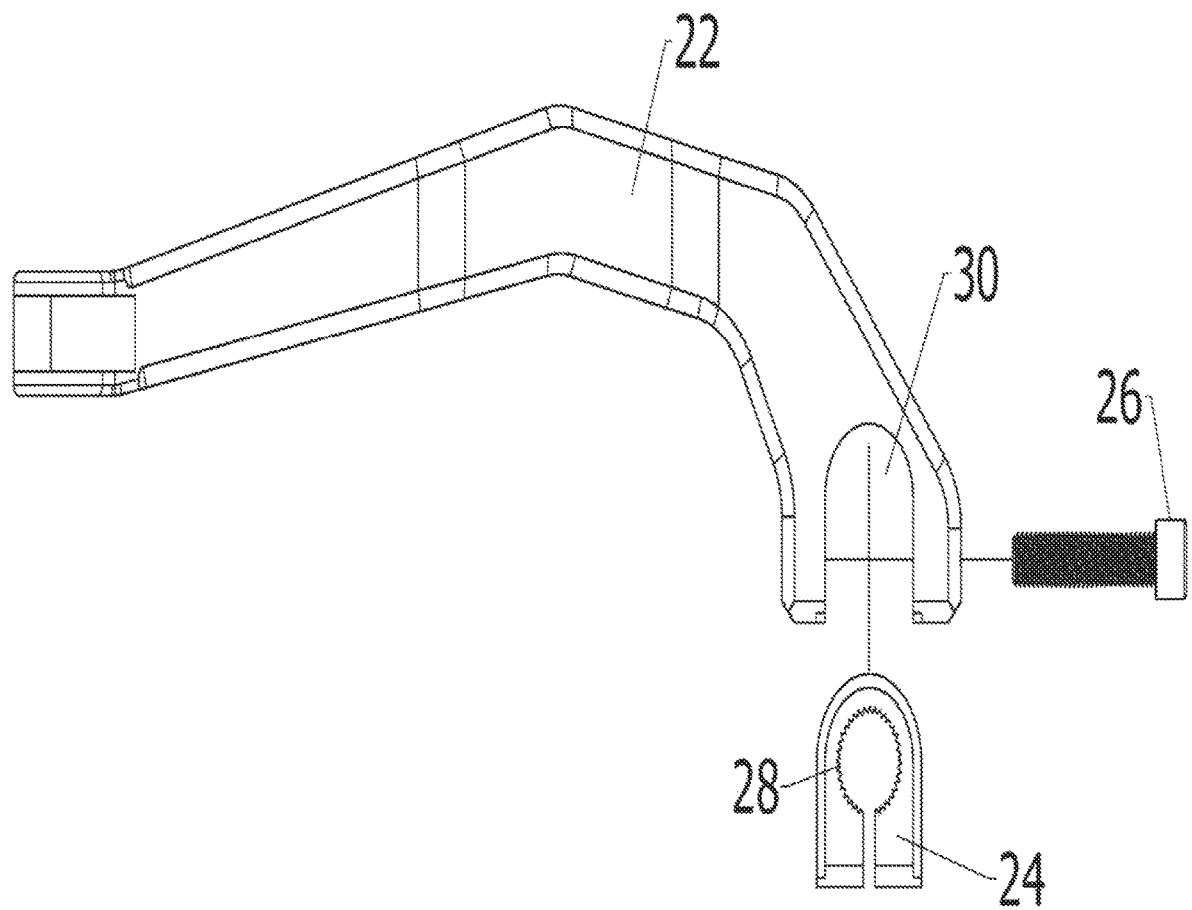

| | | | |
|---|---|---|---|
| 4,061,051 A | | 12/1977 | Grandis |
| 4,083,263 A | * | 4/1978 | Lundquist .............. B62K 23/08 |
| | | | 74/473.16 |
| 4,728,218 A | | 3/1988 | Durham |
| 4,741,222 A | * | 5/1988 | Berndt ................. B60W 30/18 |
| | | | 180/315 |
| 5,661,999 A | | 9/1997 | Carone |
| 5,779,254 A | | 7/1998 | James et al. |
| 6,394,214 B1 | | 5/2002 | Hahm |
| 7,114,739 B2 | | 10/2006 | Colano |
| 7,278,336 B2 | | 10/2007 | Clark |
| 7,891,902 B2 | | 2/2011 | Pettey |
| 10,065,707 B1 | | 9/2018 | Furia et al. |
| 2018/0229807 A1 | | 8/2018 | Furia et al. |

OTHER PUBLICATIONS

"U.S. Appl. No. 15/429,510, Notice of Allowance dated Jun. 5, 2018", 7 pgs.

"U.S. Appl. No. 15/429,510, Response filed May 7, 2018 to Non Final Office Action dated Dec. 6, 2017", 9 pgs.

* cited by examiner

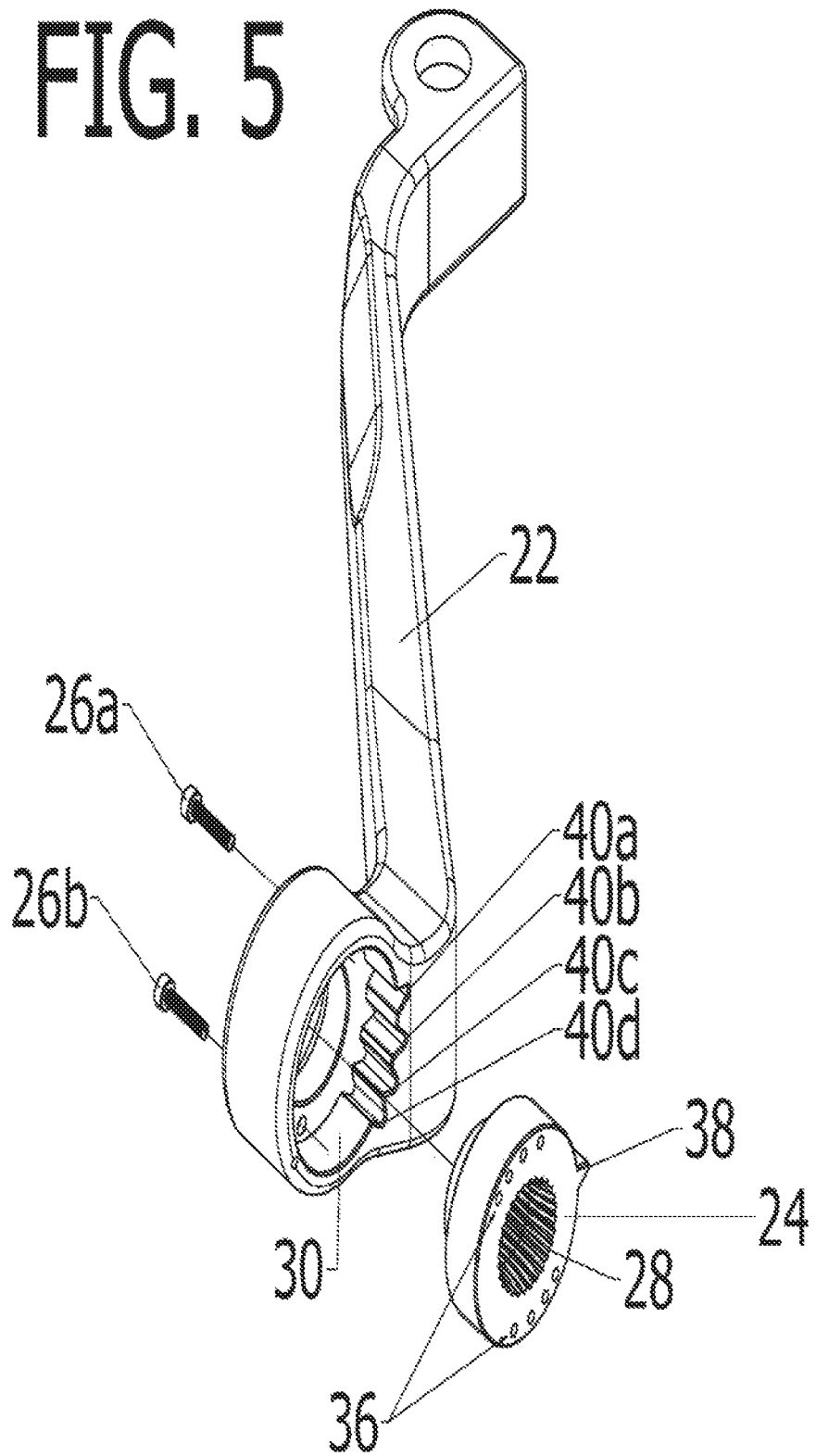

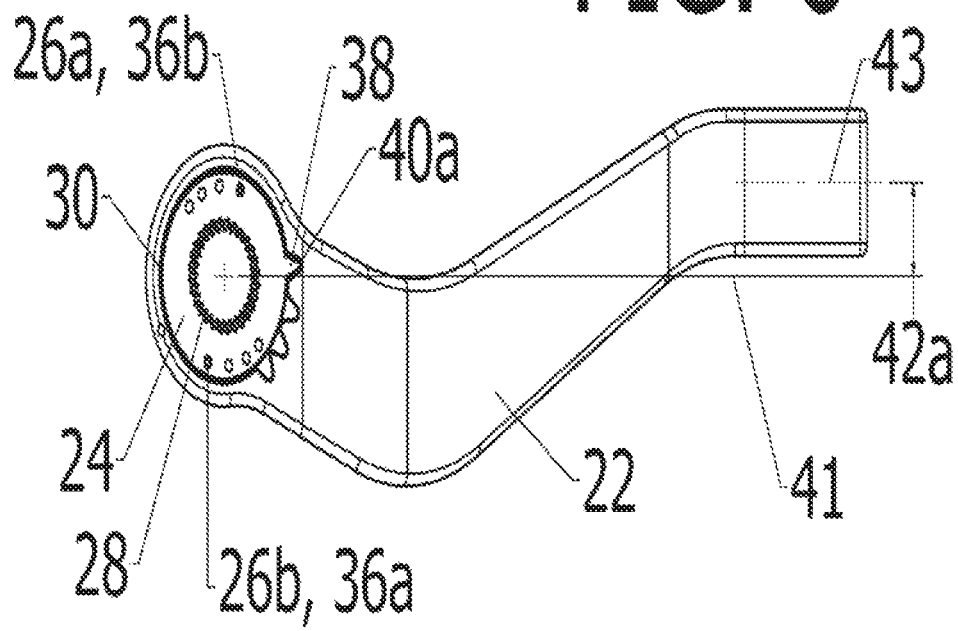
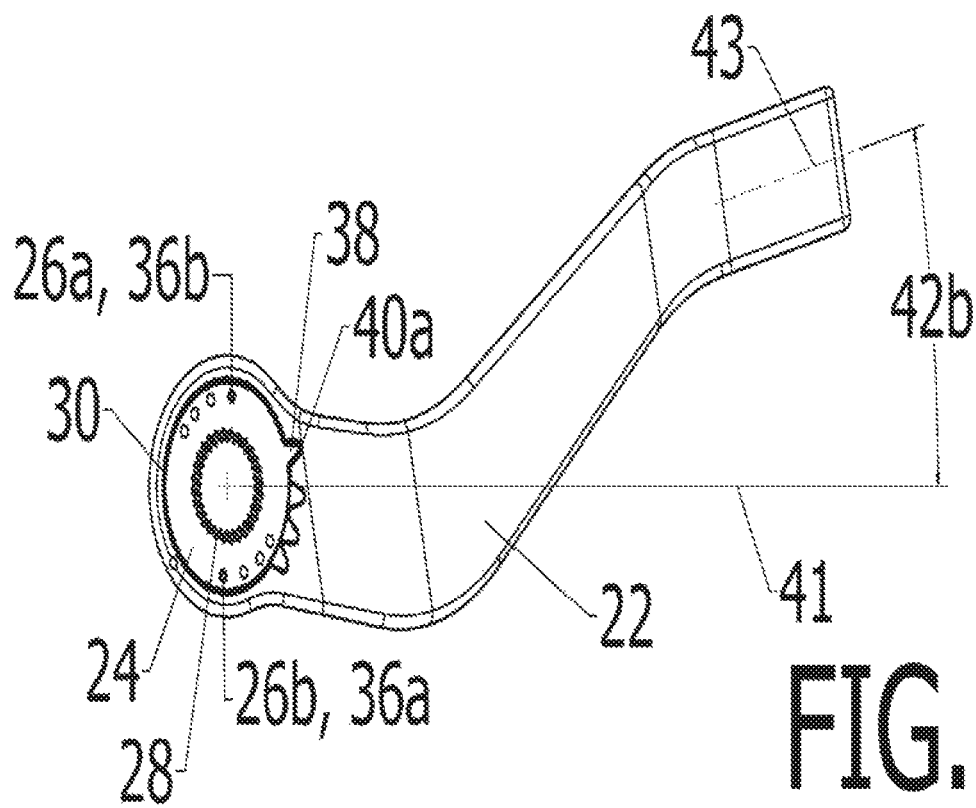

GEAR SHIFT LEVER ASSEMBLY

CROSS-REFERENCE TO RELATED APPLICATION

This application is a continuation of U.S. patent application Ser. No. 15/429,510, filed Feb. 10, 2017, which is incorporated by reference herein in its entirety.

BACKGROUND

1. Technical Field

The invention relates to gearshift pedal assemblies for motorcycles and the like.

2. Description of Prior Art

The following is a tabulation of some prior art that presently appears relevant:

| U.S. Patents | | | | |
|---|---|---|---|---|
| 2,540,926 | A | 2/1 | Zook | 192/3.51 |
| 4,061,051 | A | 12/1 | Grandis | 74/473.16 |
| 5,661,999 | A | 9/1 | Carone | 74/473.16 |
| 5,779,254 | A | 7/1 | James et al. | 280/291 |
| 6,394,214 | B1 | 5/1 | Hahm | 180/230 |
| 37,278,336 | B2 | 3/14 | Clark | 74/512 |

A standard motorcycle shift lever assembly is typically a multi-piece lever device, consisting of the shift lever arm, the shift lever knob, the shift lever connecting pin, the shift lever knob spring, and a connecting bolt. The device is typically mounted in a standard position on a motorcycle and is used for manually shifting gears by using one's foot to lift or lower the position of the shift lever knob connected to the shift lever arm. This shifting of gears is performed regularly in the process of riding a motorcycle.

The main body of a shift lever arm varies in length and curvature to fit specific applications, manufacturers, and models. The shift lever arm attaches to the engine connection to a shift lever spindle shaft. The shift lever spindle shaft is a rod with a typically splined end for attachment to the shift lever arm while the other end of the spindle shaft connects to the engine's mechanical gearing system. There is typically a boring bole with splined grooves at the end of the shift lever arm that connects to the shift lever spindle shaft, and the splined grooves in this boring hole mate with corresponding grooves on the shift lever spindle shaft. There is typically one 'stock' installation position intended for the shift lever arm when connecting the shift lever arm onto the spindle shaft that typically positions the shift lever knob at a height that is generally even with the footrest.

Most motorcycles are designed to suit one 'standard' body size that the manufacturer determines to be 'average'. Most manufacturers build motorcycles to fit an 'average' male of medium build, 150 to 160 pounds, with size 8-9 feet. In the case of the shift lever assembly, there is a generally accepted shift lever position, length, and height that presumes the motorcycle operator is of a 'standard' body type with size 8-9 feet. There is an obvious problem with anyone with a foot size outside of this 'standard' size or with physical limitations that prevent them from operating the shifter in the 'standard' position. Stock shift lever assemblies are not adjustable for length or height and are intended to be installed onto motorcycles in a single fixed 'standard' position that is determined by the manufacturer. A rider with a foot size outside of the predetermined 'standard' size or with physical limitations that prevent them from moving their foot to operate the shifter within the 'standard' shift position may not be able to comfortably or safely operate the shifter. Such riders may modify their operating stance and riding position to operate the shifter, but this can compromise balance and safety.

The shift lever arm is intended for easy removal and replacement on the shift lever spindle shaft in the 'standard' position. Some prior art shift lever assemblies can be removed from the shift lever spindle shaft, rotated clockwise or counterclockwise, and replaced in a different position on the spindle shaft thereby changing the height of the shift lever to move the lever knob higher or lower than the predetermined 'standard' position. While it may be possible to adjust the height of some stock shift levers in this manner, the adjustment is typically impractical since rotating the position by the minimum of one spline groove on the spindle shaft often moves the shift lever knob too far up or down. In addition, moving the position of a shift lever on the spindle shaft is likely to cause interference with another part on the motorcycle such as the engine, frame, or other components.

The adjustable shift lever assembly in U.S. Pat. No. 7,278,336 to Clark (2007) allows for the adjustment in length of a shift lever assembly, but provides only minimal adjustment for the height of the shift lever assembly.

Prior art shift lever arms are typically constructed from one material type. The mechanical and material requirements of a shift lever arm at the area of connection to the spindle shaft may be greater than along the extended length of the shift lever arm. The stresses on the splined groove connection between a prior art shift lever arm and a spindle shaft are typically greater than the stresses along the extended length of the shift lever arm due to the leverage applied during operation. The most common type of failure on shift lever products is caused by damage to the splined groove connection between the shift lever arm and the spindle shaft which requires replacement of the entire shift lever assembly.

SUMMARY

In accordance with one embodiment a shift lever assembly comprises a shift lever arm with an independent spindle shaft mount insert at the area of connection with the shift lever spindle shaft.

Advantages

Thus several advantages of one or more aspects of a shift lever with independent spindle shaft mount insert are as follows: the option to fine-tune the vertical height or horizontal length of the shift lever arm with respect to the spindle shaft, engine, frame, footpegs, or other components, the ability for the section of a shift lever arm that attaches to a spindle shaft be made of a material different than that of the shift lever arm to better suite strength requirements, the possibility of providing replacement options at a lower manufacturing that can be passed on to the consumer, the option to be designed so that the splined groove hole within the independent spindle shaft mount insert is not located directly in the center of the insert but instead it may be positioned 'in orbit' of the standard center position to provide additional adjustment options, the ability to provide additional weight savings compared to prior art, and the benefit of visual appeal associated with the contrast between two adjoined parts. These and other advantages of one or more aspects will become apparent from a consideration of the ensuing description and accompanying drawings.

DRAWINGS

Figures

Figure 2:
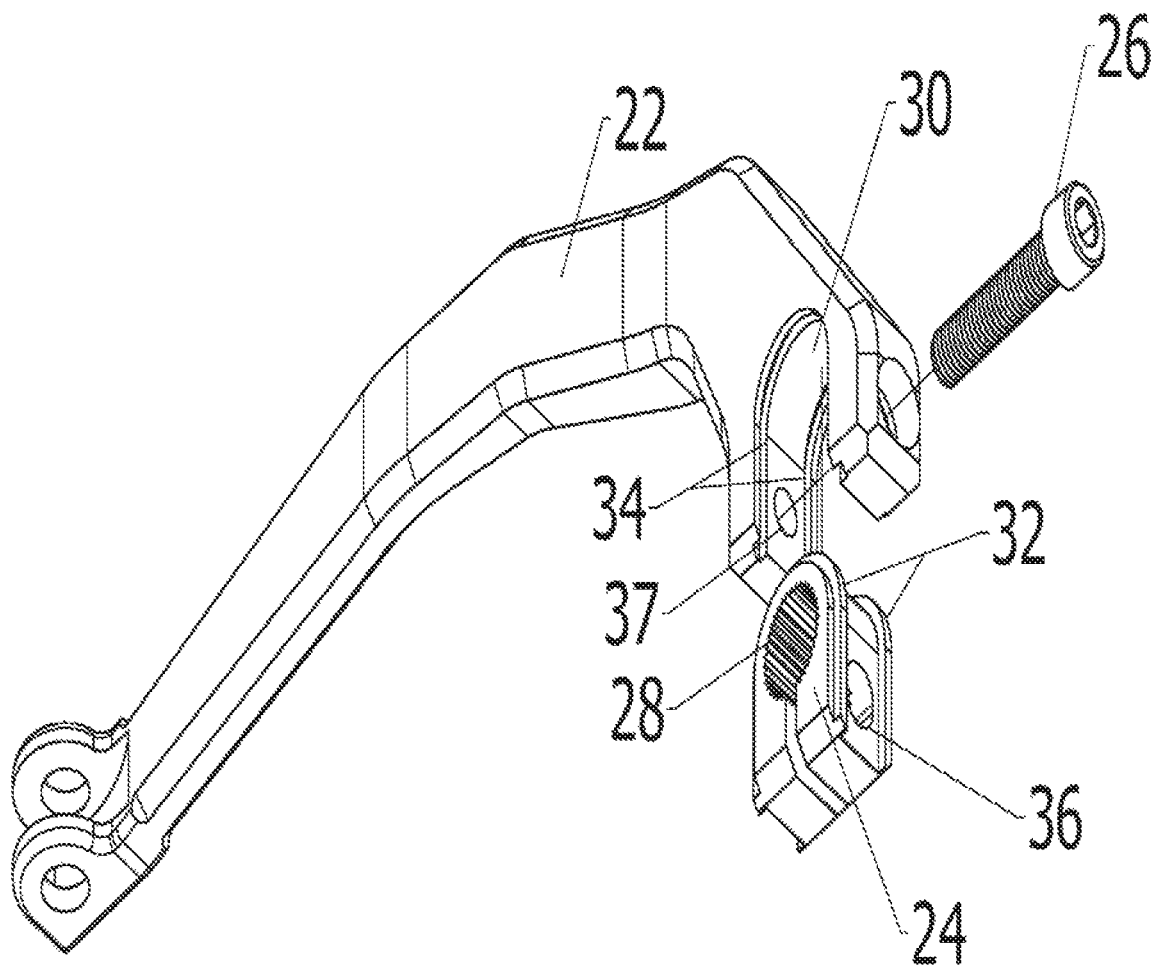
Figure 3:
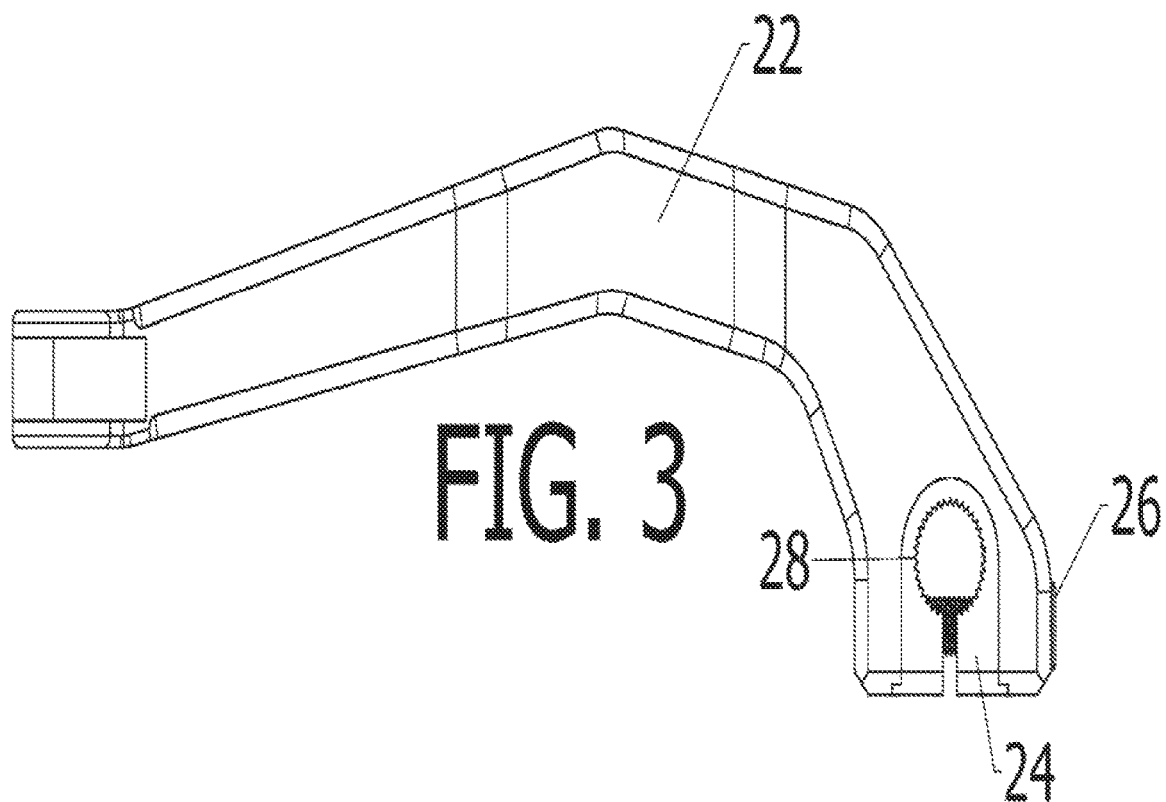
Figure 4:
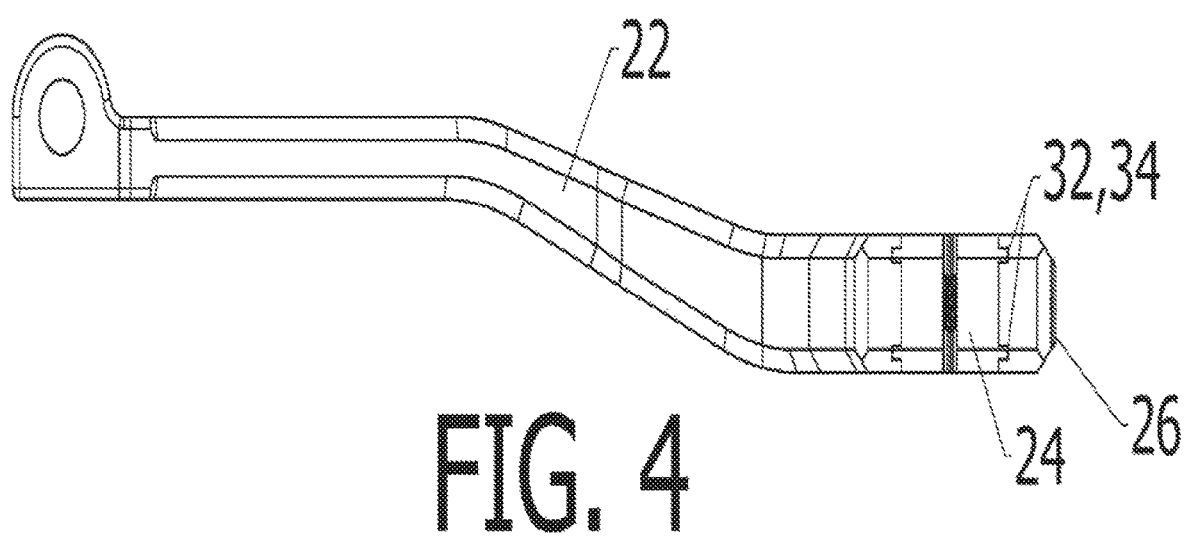
Figure 8:
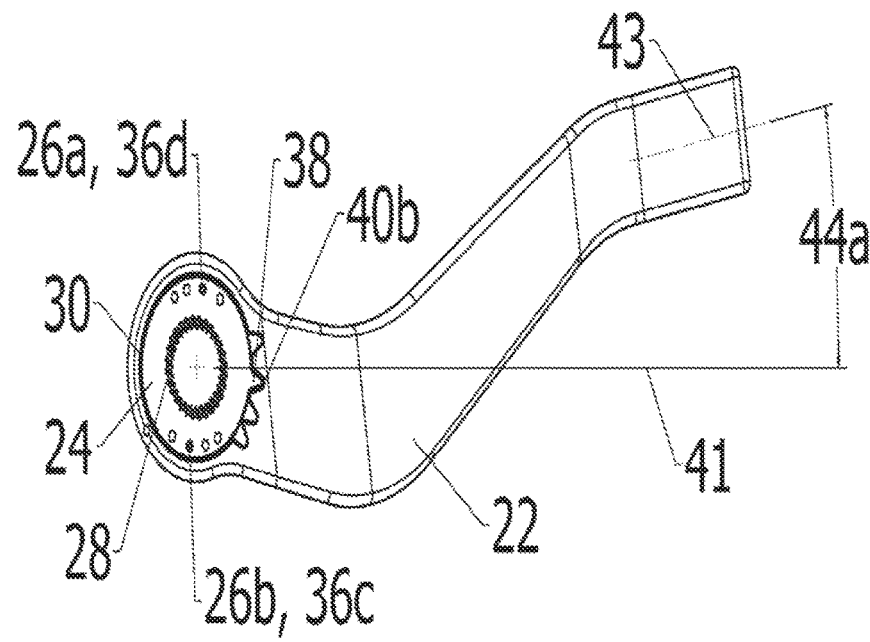
Figure 9:
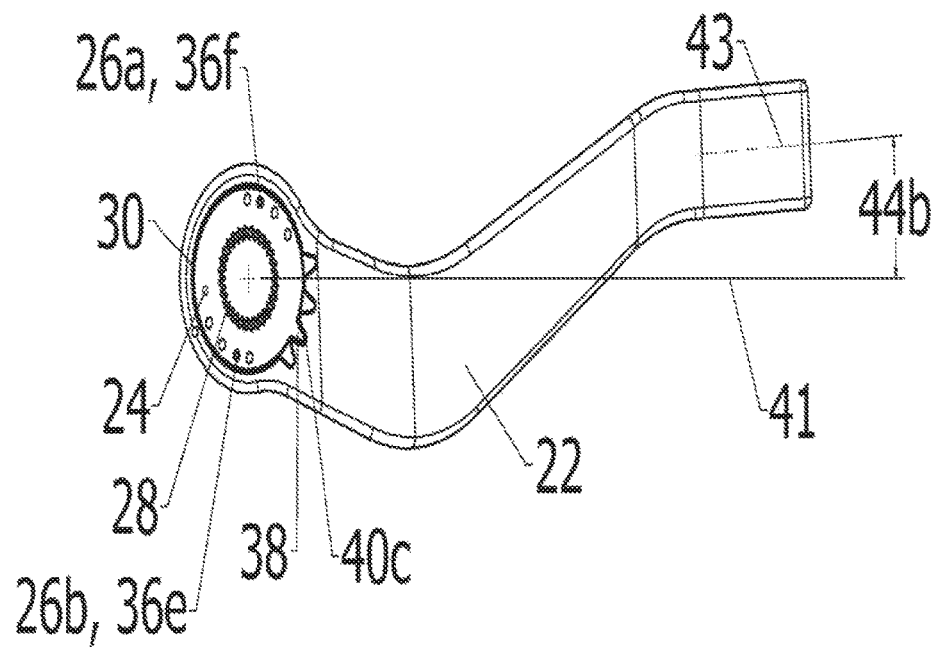
Figure 10:
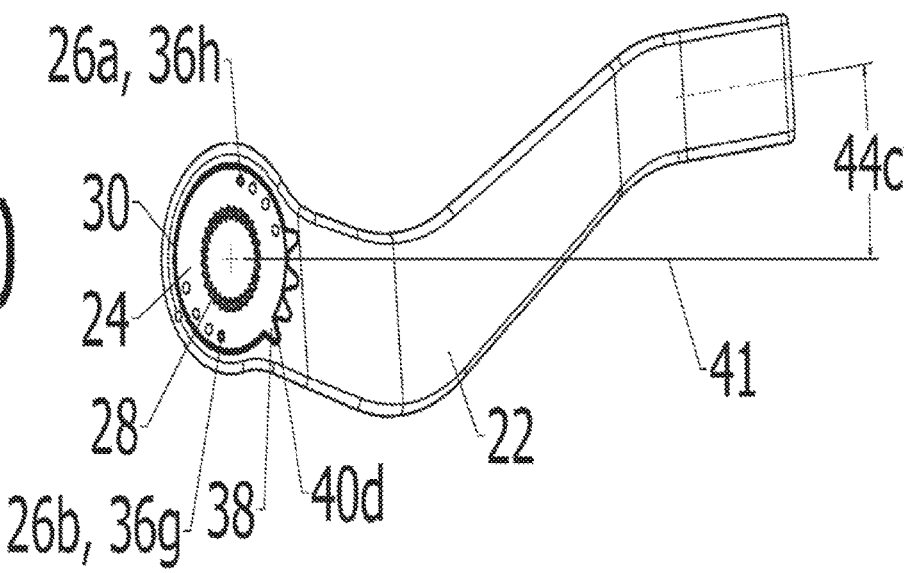

FIG. 1 is an exploded side view of the first embodiment.
FIG. 2 is an exploded perspective view of the first embodiment.
FIG. 3 is an assembled side view of the first embodiment.
FIG. 4 is an assembled bottom view of the first embodiment.
FIG. 5 is an exploded perspective view of an alternative embodiment.
FIG. 6 is an assembled side view of an alternative embodiment showing original height position 42a.
FIG. 7 is an assembled side view of an alternative embodiment showing original height position 42b.
FIG. 8 is an assembled side view of an alternative embodiment showing unique height position 44a.
FIG. 9 is an assembled side view of an alternative embodiment showing unique height position 44b.
FIG. 10 is an assembled side view of an alternative embodiment showing unique height position 44c.

REFERENCE NUMERALS shift level arm 22
independent spindle shaft mount insert 24
connecting bolt 26
connecting bolt 'a' 26a
connecting bolt 'b' 26b
splines 28
spindle shaft mount insert slot 30
guiding ridges 32
guiding channels 34
insert connecting bolt hole 36
insert connecting bolt hole 'a' 36a
insert connecting bolt hole 'b' 36b
insert connecting bolt hole 'c' 36c
insert connecting bolt hole 'd' 36d
insert connecting bolt hole 'e' 36e
insert connecting bolt hole 'f' 36f
insert connecting bolt hole 'g' 36g
insert connecting bolt hole 'h' 36h
shift lever connector bolt hole 37
position selector point 38
position selector channel 'a' 40a
position selector channel 'b' 40b
position selector channel 'c 40c
position selector channel 'd' 40d
original height position 'a' 42a
original height position 'b' 42b
shift lever knob centerline 43
unique height position 'a' 44a
unique height position 'b' 44b
unique height position 'c' 44c

DETAILED DESCRIPTION—FIGS. 1, 2, 3, 4—FIRST EMBODIMENT

The present invention is a shift lever with independent spindle shaft mount insert. This invention may have several embodiments and is not limited to the embodiments presented.

As shown in the exploded side view of the first embodiment in FIG. 1, a shift lever with independent spindle shaft mount insert can consist of a shift lever arm 22 having precisely positioned splines 2 within a independent spindle shaft mount insert 24. The independent spindle shaft mount insert 24 is to be installed inside of a spindle shaft mount insert slot 30 where the assembly can then be held together with a connecting bolt 26. The exploded assembly perspective view of the first embodiment presented in FIG. 2 shows the guiding ridges 32 on the independent spindle shaft mount insert 24 that is to direct the independent spindle shaft mount insert 24 along guiding channels 34 of the spindle shaft mount insert slot 30 on the shift lever arm 22. FIG. 2 also shows the insert connecting bolt hole 36 and shift lever connector bolt hole 37 where the connecting bolt 26 can be installed to hold the independent spindle shaft mount insert 24 in place within the spindle shaft mount insert slot 30 of the shift lever arm 22.

FIG. 3 shows a side view of the first embodiment with the shift lever arm 22, independent spindle shaft mount insert 24, splines 28, and connecting bolt 26 assembled together. The assembled bottom view of the first embodiment shown in FIG. 4 reveals how the guiding ridges 32 mate with the guiding channels 34. As seen in FIG. 4, the guiding ridges 32 and guiding channels 34 can help hold the independent spindle shaft mount insert 24 in place within the spindle shaft mount insert slot 30 of the shift lever arm 22.

OPERATION—FIGS. 1, 2, 3, 4—FIRST EMBODIMENT

To use a shift lever with independent spindle shaft mount insert, one must begin installing the independent spindle shaft mount inert 24 by entering the guiding ridges 32 into the guiding channels 34 of the spindle shaft mount insert slot 30 of the shift lever arm 22 shown in the first embodiment in FIG. 2. After the independent spindle shaft mount insert 24 has been installed into the spindle shaft mount insert slot 30 of the shift lever arm 22 as shown in FIGS. 3 and 4, the first embodiment is to be installed onto the shift lever spindle shaft by aligning the splines 28 of the independent spindle shaft mount insert 24 with the splines of the spindle shaft in the desired position. Next the connecting bolt 26 should be installed through the insert connector bolt hole 36 in the independent spindle shaft mount insert 24 and shift lever connector bolt hole 37 of the shift lever arm 22 seen in FIG. 2. One should then tighten the connecting bolt 26 to help secure the independent spindle shaft mount insert 24 and shift lever arm 22 assembly seen in FIGS. 3 and 4 to the spindle shaft.

To uninstall the first embodiment shown in FIGS. 3 and 4, one loosens the connecting bolt 26 and removes it from the insert connecting bolt hole 36 and shift lever connector bolt hole 37. The independent spindle shaft mount insert 24 and shift lever arm 22 can then be removed from the spindle shaft. Once removed from the spindle shaft the independent spindle shaft mount insert 24 can be removed from the spindle shaft mount insert slot 30 of the shift lever arm 22 as seen in FIGS. 1 and 2.

The ability to remove and replace an independent spindle shaft mount insert 24 from a shift lever arm 22 of the first embodiment shown in FIGS. 1-4 can be advantageous for multiple reasons. One of the advantages of a shift lever with independent spindle shaft mount insert is that in the case the independent spindle shaft mount insert 24 is damaged, a new independent spindle shaft mount insert 24 can be issued at a lower cost to consumer and seller than the alternative method of replacing the entire shift lever. Another advantage of the first embodiment of the shift lever with independent spindle shaft mount insert is having the option to manufacture a shift lever arm 22 and independent spindle shaft mount insert 24 from different materials in order to better suit the mechanical characteristics and stresses associated with each. An additional advantage of the first embodiment of the shift lever with independent spindle shaft mount insert is the potential visual appeal associated with contrasting materials and finishes of an independent spindle shaft mount insert 24 and a shift lever arm 22. A supplemental advantage of the first embodiment of the shift lever with independent spindle shaft mount insert is the ability to adjust the vertical or horizontal position of the shift lever by modifying the independent spindle shaft mount insert 24.

DETAILED DESCRIPTION—FIGS. 5, 6, 7, 8, 9, 10—ALTERNATIVE EMBODIMENTS

FIG. 5 shows an exploded perspective view of an alternative embodiment of a shift lever with independent spindle shaft mount insert consisting of a shift lever arm 22, position selector channels 40a 40b 40c 40d, a spindle shaft mount insert slot 30, connecting bolts 26a 26b, insert connector bolt holes 36a 36b 36c 36d 36e 36f 36g 36h, independent spindle shaft mount insert 24, splines 28, and a position selector point 38.

It is important to note that the orientation of the ridges and valleys of the splines 28 found in the independent spindle shaft mount insert 24 do not change with respect to the horizontal reference line 41 for FIGS. 6-10. The fixed orientation of the ridges and valleys of the splines 28 with respect to the horizontal reference line 41 represents the fixed orientation of a shift lever spindle shaft standard on most motorcycles.

OPERATION—FIGS. 5, 6, 7, 8, 9, 10—ALTERNATIVE EMBODIMENTS

A side view of an assembled alternative embodiment shown in FIG. 6 shows connecting bolts 26a and 26b attached to respective insert connecting bolt holes 36b and 36a to hold the independent spindle shaft mount insert 24 within the spindle shaft mount insert slot 30. In FIG. 6, the position selector point 38 located on the independent spindle shaft mount insert 24 is installed into the position selector channel 40a on the shift lever arm 22. FIG. 6 shows a possible original height position 42a of an alternative embodiment that can match the angle of prior art shift levers. The original height position 42a is measured between the horizontal reference line 41 and the shift lever knob centerline 43. The original height position 42a represents a configuration possible with prior art shift levers.

FIG. 7 shows an assembled side view of an alternative embodiment with the independent spindle shaft mount insert 24 installed into the spindle shaft mount insert slot 30 located on the shift lever arm 22 with the position selector point 38 still installed into the position selector channel 40a. At the orientation shown in FIG. 7, the original height position 42b can be measured between the horizontal reference line 41 and the shift lever knob centerline 43. The original height position 42b represents a second configuration possible with prior art shift levers.

The assembled side view of an alternative embodiment given in FIG. 8 shows the independent spindle shaft mount insert 24 installed into the spindle shaft mount insert slot 30 of the shift lever arm 22 with the position selector point 38 installed into position'selector channel 40b. FIG. 8 shows connecting bolts 26a and 26b can be installed into the respective insert connecting bolt holes 36d and 36c. In the configuration shown in FIG. 8, the unique height position 44a can be measured between the horizontal reference line 41 and the shift lever knob centerline 43. The unique height position 44a represents a unique configuration that cannot be achieved with prior art shift levers. The unique height position 44a is different from that of unique height positions 44b and 44c and original height positions 42a and 42b.

The assembled side view of an alternative embodiment given in FIG. 9 shows the independent spindle shaft mount insert 24 installed into the spindle shaft mount insert slot 30 of the shift lever arm 22 with the position selector point 38 installed into position selector channel 40c. FIG. 9 shows connecting bolts 26a and 26b can be installed into the respective insert connecting bolt holes 36g and 36e. In the configuration shown in FIG. 9, the unique height position 44b can be measured between the horizontal reference line 41 and the shift lever knob centerline 43. The unique height position 44b represents a unique configuration that cannot be achieved with prior art shift levers. The unique height position 44b is different from that of unique height positions 44a and 44c and original height positions 42a and 42b.

The assembled side view of an alternative embodiment given in FIG. 10 shows the independent spindle shaft mount insert 24 installed into the spindle shaft mount insert slot 30 of the shift lever arm 22 with the position selector point 38 installed into position selector channel 40d. FIG. 10 shows connecting bolts 26a and 26b can be installed into the respective insert connecting bolt holes 36h and 36g. In the configuration shown in FIG. 10, the unique height position 44c can be measured between the horizontal reference line 41 and the shift lever knob centerline 43. The unique height position 44c represents a unique configuration that cannot be achieved with prior art shift levers. The unique height position 44c is different from that of unique height positions 44a and 44b and original height positions 42a and 42b.

In addition to sharing the same advantages of the first embodiment, the alternative embodiment of a shift lever with independent spindle shaft mount insert shown in FIGS. 5-10 has the advantage of providing additional unique shift lever height positions that allow more 'fine tune' height adjustments of a shift lever that cannot be achieved with prior art shift levers. The ability to 'fine tune' the shift lever height position provides the user with the capacity to install a shift lever with independent spindle shaft mount insert at a height that bettor suits the rider's unique preferences than prior art shift levers which could improve one's balance, safety, and comfort on a motorcycle.

CONCLUSION, RAMIFICATIONS, AND SCOPE

Thus the reader will see that a motorcycle shift lever of the various embodiments can utilize a replaceable shift shaft mount insert. A shift lever with independent spindle shaft mount insert can be made of a material different than that of the shift lever arm to better suite strength requirements and can also offer more height and length adjustment than prior art shift levers. Furthermore, a shift lever with independent spindle shaft mount insert has additional advantages in that:
  it can offer easy replacement options if the replaceable shift lever spline insert or shift lever arm is damaged;
  it can provide replacement options at a lower cost to consumer and seller if the replaceable shift lever spline insert or shift lever arm is damaged;

it can be designed so that the shift lever arm and knob may be repositioned with respect to the engine, frame, footpegs, and other components;

it can be designed so that the grooved spline hole within the independent spindle shaft mount insert is not located directly in the center of the insert but instead it may be positioned 'in orbit' of the standard center position to provide additional adjustment options;

it can provide additional weight savings compared to prior art; and it can benefit from the visual appeal associated with the contrast between two adjoined parts.

These advantages can allow a shift lever with independent spindle shaft mount insert to be more reliable, adjustable, visually appealing, and can allow the rider to have better balance, control, safety, and comfort on a motorcycle.

In addition, a position selector point and position selector channel may not be required to select unique height positions in alternative embodiments. Other types of shift lever insert position selection methods can be used to achieve desired unique height positions. Different embodiments may also not utilize features such as the guiding ridge and guiding channel to align and hold a replaceable shift lever spline insert in place.

Another embodiment of a shift lever with independent spindle shaft mount insert can allow a single shift lever arm from one make and model to be fitted to different makes and models by simply changing the independent spindle shaft mount insert. This embodiment would allow one shift lever arm to be fitted with different independent spindle shaft mount inserts that permit connection to a range of shift lever spindle shaft shapes and sizes.

Although the description above contains many specificities, these should not be construed as limiting the scope of the embodiments but as merely providing illustrations of some of several embodiments. For example, a independent spindle shaft mount inserts can embody many shapes and sizes. Additional embodiments may also not require the use of a connecting bolt to hold the shift lever spline insert into the shift lever arm. Other embodiments may connect the shift lever spline insert and shift lever arm in alternative fashions.

Thus the scope of the embodiments should be determined by the appended claims and their legal equivalents, rather than by the examples given.

The invention claimed is:

1. A gear shift lever assembly for a motorcycle having a gear selector spindle shaft, the assembly comprising:
   a gear shift lever arm including:
   a distal foot-peg end; and
   a proximal end for facilitating securement of the gear shift lever arm to the gear selector spindle shaft of the motorcycle, the proximal end of the gear shift lever arm including a recessed volume including a plurality of position selector channels and at least one first passageway for accepting passage of a mounting bolt; and
   a separate spindle shaft mount insert sized to fit within the recessed volume of the gear shift lever arm, the spindle shaft mount insert comprising:
   a splined aperture having a longitudinal axis, the splines of the splined aperture matching the splines of the gear selector spindle shaft,
   a position selector point locatable in one of the plurality of position selector channels, and at least one second passageway, the at least one second passageway aligned with the at least one first passageway when the position selector point is located in one of the plurality of position selector channels;
   the gear shift lever assembly mountable to the gear selector spindle shaft of the motorcycle with the spindle shaft mount insert fitted into the recessed volume of the proximal end of the gear shift lever arm, and secured therein by a mounting bolt passed through the aligned at least one first and second passageways.

2. A gear shift lever assembly for a motorcycle having a gear selector spindle shaft, the assembly comprising:
   a gear shift lever arm including:
   a distal foot-peg end; and
   a bifurcated proximal end for facilitating securement of the gear shift lever arm to the gear selector spindle shaft of the motorcycle, the bifurcated proximal end of the gear shift lever arm including or carrying a first passageway for accepting passage of a mounting bolt for securing the gear shift lever assembly to the gear selector spindle shaft of the motorcycle; and
   a separate spindle shaft mount insert sized to fit within the bifurcated ends of the gear shift lever arm, the spindle shaft mount insert comprising:
   a splined aperture having a longitudinal axis, the splines of the splined aperture matching the splines of the gear selector spindle shaft, and
   a second passageway including a longitudinal axis transverse to the longitudinal axis of the splined aperture, the second passageway aligned with the first passageway when the spindle shaft mount insert is disposed within the bifurcated ends of the gear shift lever arm to form the gear shift level assembly;
   the gear shift lever assembly mountable to the gear selector spindle shaft of the motorcycle with the spindle shaft mount insert interposed between the bifurcated proximal end of the gear shift lever arm and the gear selector spindle shaft, and secured to the gear selector spindle shaft of the motorcycle by the mounting bolt passed through the aligned first and second passageways.

3. The gear shift lever assembly of claim 2 wherein the spindle shaft mount insert is selectably placeable in one or more alternative positions.

4. The gear shift lever assembly of claim 2 further comprising one or more guide formations for guiding the spindle shaft mount insert between the bifurcated proximal end of the gear shift lever arm.

5. The gear shift lever assembly of claim 2 wherein a vertical height of the distal foot-peg end of the gear shift lever arm can be adjusted based on a rotational position of the spindle shaft mount insert.

6. The gear shift lever assembly of claim 2 wherein an operative length of the gear shift lever arm is adjustable.

7. The gear shift lever assembly of claim 2 wherein a distance between a position on the gear shift lever arm and a fixed component of the motorcycle is adjustable.

8. The gear shift lever assembly of claim 1 wherein the spindle shaft mount insert is selectably placeable in one or more alternate positions.

9. The gear shift lever assembly of claim 1 further comprising one or more guide formations for guiding the spindle shaft mount insert on the proximal end of the gear shift lever arm.

10. The gear shift lever assembly of claim 1 wherein a vertical height of the distal footpeg end of the gear shift lever arm can be adjusted based on a rotational position of the spindle shaft mount insert.

11. The gear shift lever assembly of claim 1 wherein an operative length of the gear shift lever arm is adjustable.

12. The gear shift lever assembly of claim 1 wherein a distance between a position on the gear shift lever arm and a fixed component of the motorcycle is adjustable.

* * * * *